US007634487B2

(12) United States Patent
Bae et al.

(10) Patent No.: US 7,634,487 B2
(45) Date of Patent: Dec. 15, 2009

(54) SYSTEM AND METHOD FOR INDEX REORGANIZATION USING PARTIAL INDEX TRANSFER IN SPATIAL DATA WAREHOUSE

(75) Inventors: Hae Young Bae, Incheon (KR); Jae Dong Lee, Seoul (KR); Young Hwan Oh, Cheonan-si (KR); Kyoung Bae Kim, Cheongju-si (KR); Myoung Keun Kim, Incheon (KR); Soon Young Park, Incheon (KR); Ho Seok Kim, Bucheon-si (KR); Yong Il Jang, Bucheon-si (KR); Byeong Seob You, Incheon (KR); Sang Hoon Eo, Incheon (KR); Young Cheol Jeong, Incheon (KR)

(73) Assignee: Inha-Industry Partnership Institute, Inchon (KR)

( * ) Notice: Subject to any disclaimer, the term of this patent is extended or adjusted under 35 U.S.C. 154(b) by 130 days.

(21) Appl. No.: 11/433,258

(22) Filed: May 12, 2006

(65) Prior Publication Data
US 2007/0016600 A1 Jan. 18, 2007

(30) Foreign Application Priority Data
Jul. 18, 2005 (KR) ............ 10-2005-0064746

(51) Int. Cl.
*G06F 17/00* (2006.01)
(52) U.S. Cl. ............................................. 707/101
(58) Field of Classification Search ............ 707/3, 707/101
See application file for complete search history.

(56) References Cited

U.S. PATENT DOCUMENTS

| 6,122,628 | A | * | 9/2000 | Castelli et al. | 707/5 |
| 6,134,541 | A | * | 10/2000 | Castelli et al. | 707/2 |
| 2003/0063133 | A1 | * | 4/2003 | Foote et al. | 345/850 |
| 2005/0027721 | A1 | * | 2/2005 | Saenz | 707/100 |

OTHER PUBLICATIONS

Li Chen, Rupesh Choubey and Elke A. Rundensteiner, "Bulk-Insertions into R-Trees Using the Small-Tree-Large-Tree Approach", 6th ACM, 1998.
Taewon Lee, Bongki Moon and Sukho Lee, "Bulk Insertion for R-tree by Seeded Clustering", Data and Knowledge Engineering, Sep. 2005.

* cited by examiner

*Primary Examiner*—Charles Rones
*Assistant Examiner*—Fazlul Quader
(74) *Attorney, Agent, or Firm*—Bachman & LaPointe, P.C.

(57) ABSTRACT

The present invention is to provide a system and a method for index reorganization using a partial index transfer in a spatial data warehouse that minimize costs of search, split and readjustment for the index reorganization by organizing and transferring clusters with partial indexes in conformity with an index structure so that the partial indexes can be inserted directly into the existing index, thus ensuring continuous and stable data processes, the index reorganization method comprising: a first step of clustering data extracted from the source database in conformity with an index structure via the builder; a second step of generating partial indexes and transferring the partial indexes to a cluster generated according to the clustering; a third step of recording the transferred partial indexes in physically consecutive spaces, not allocated, in the spatial data warehouse server; and a fourth step of inserting the recorded partial indexes in an existing index.

8 Claims, 7 Drawing Sheets

[Figure 1]
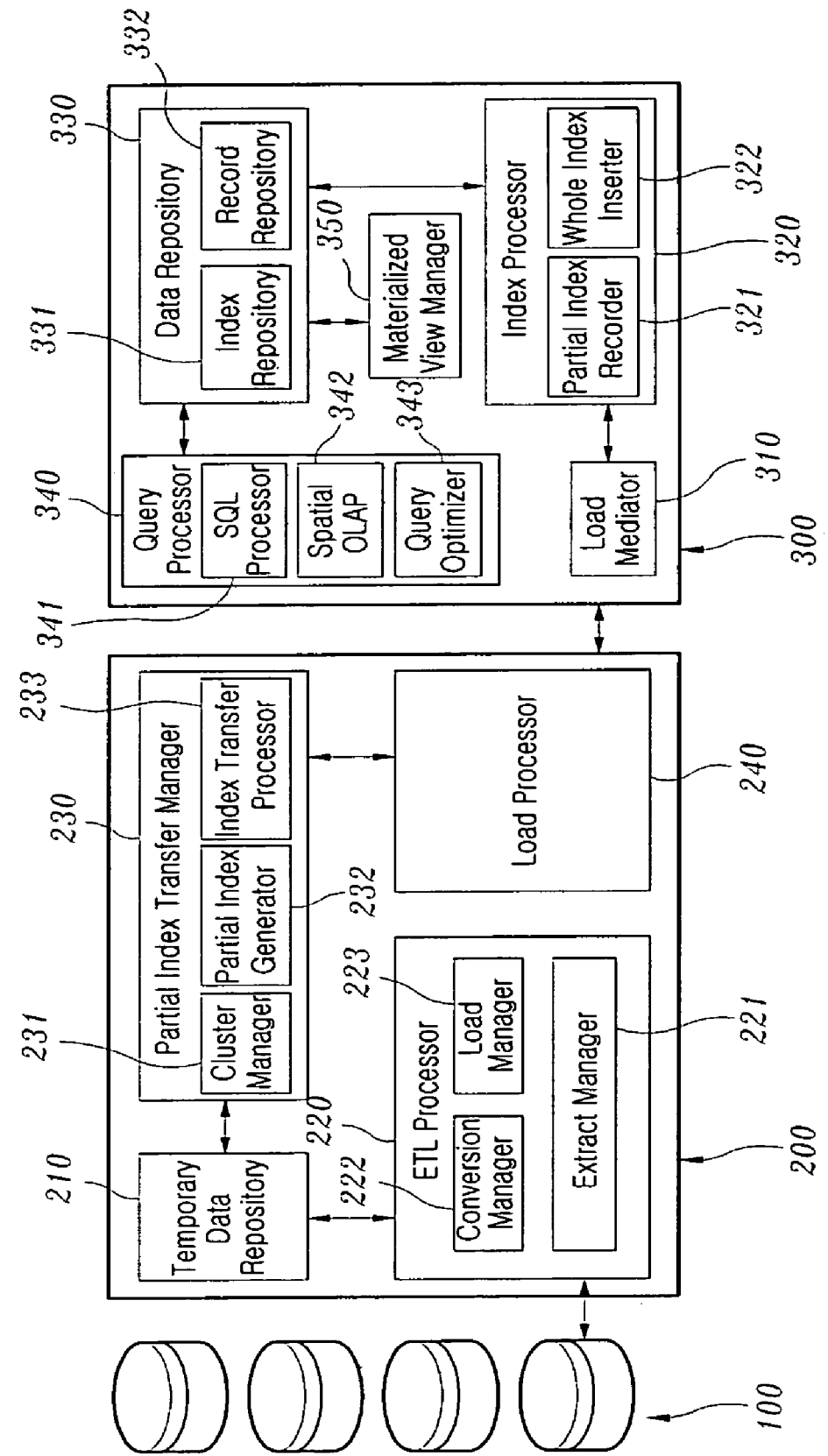

[Figure 2]
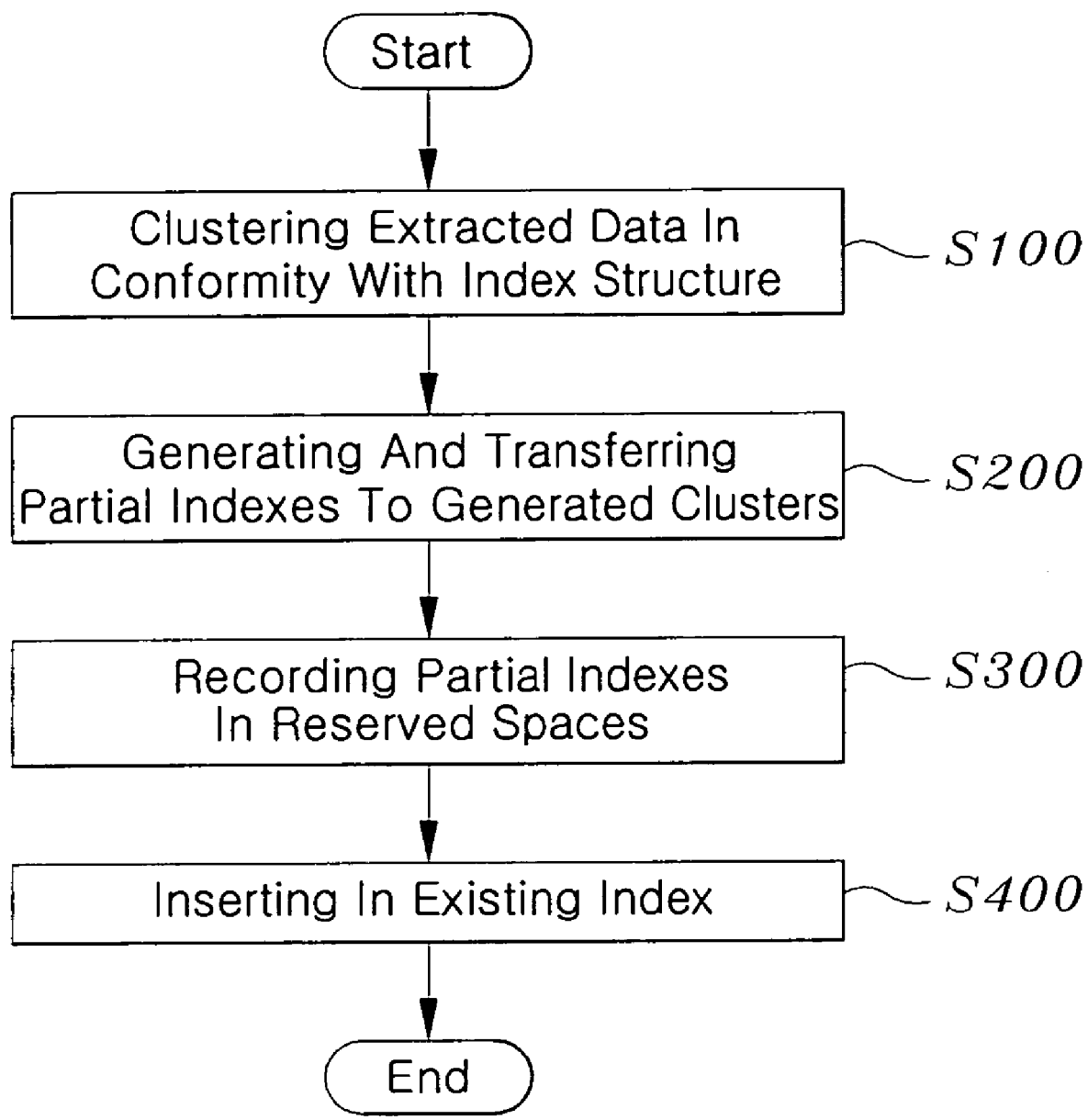

[Figure 3]
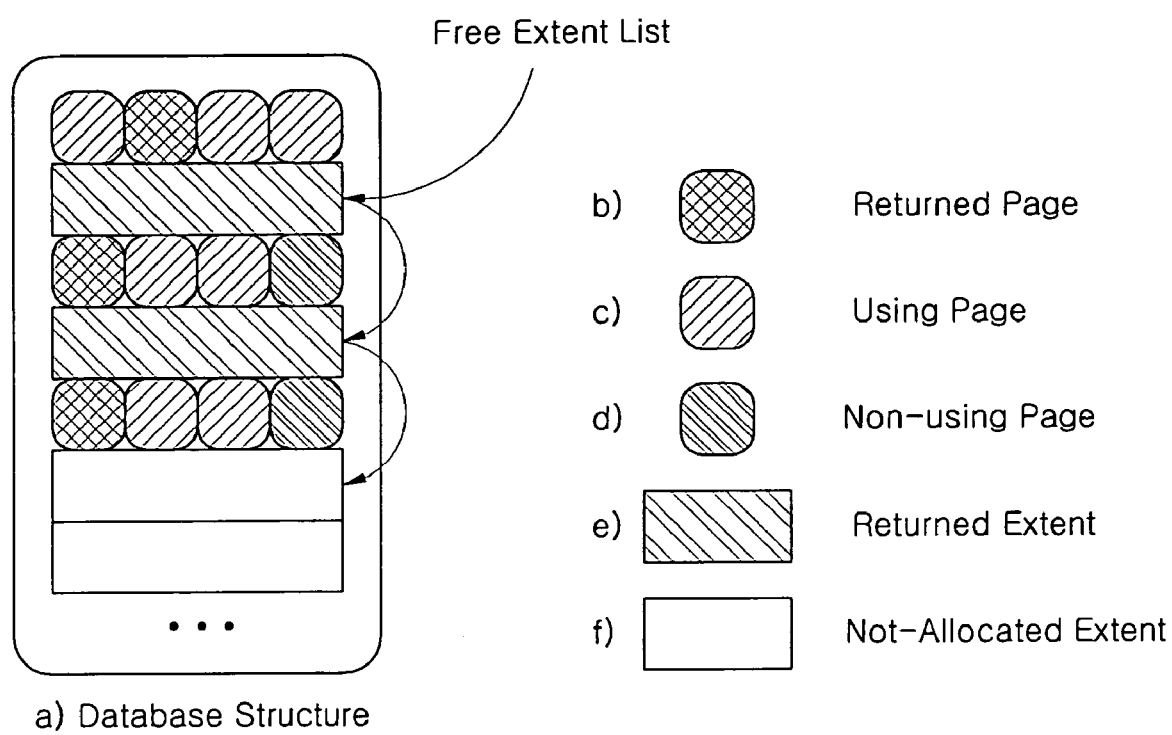
a) Database Structure

[Figure 4]
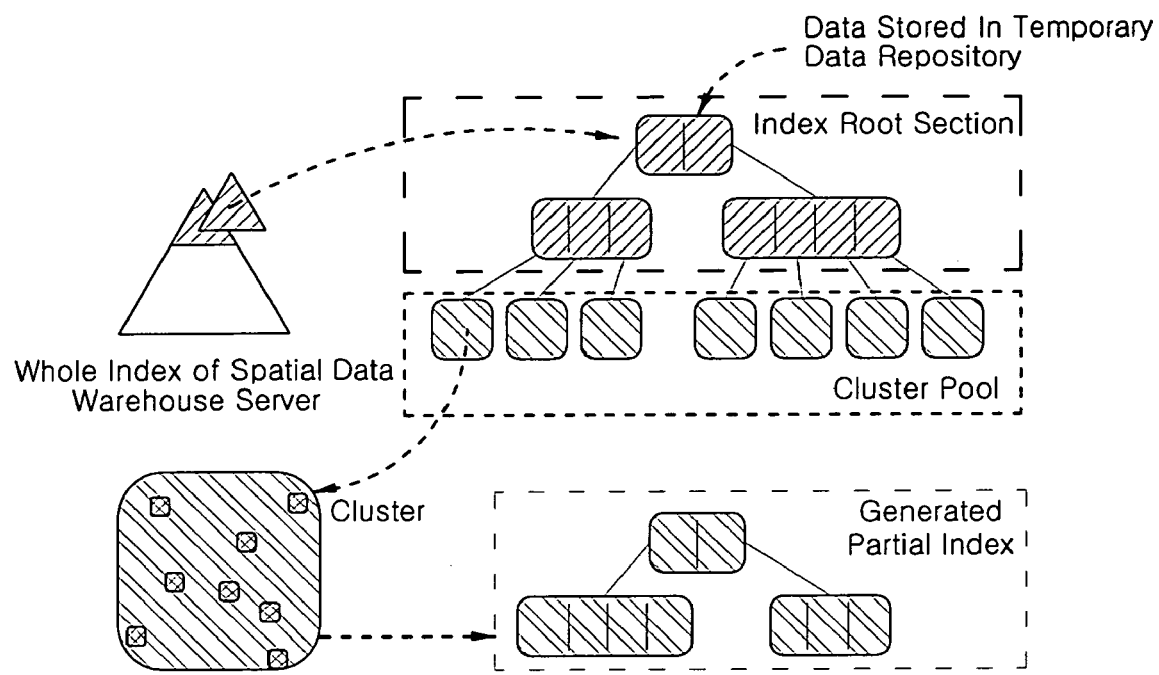

[Figure 5]
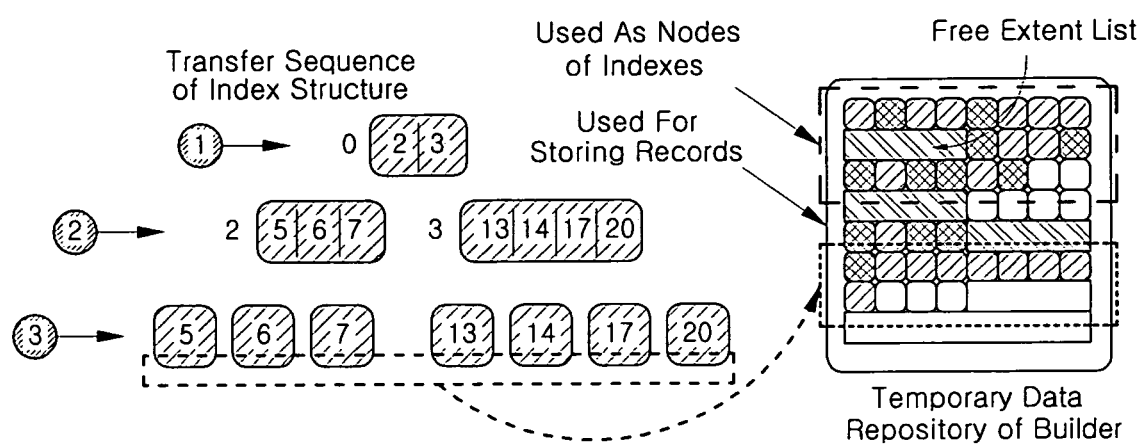

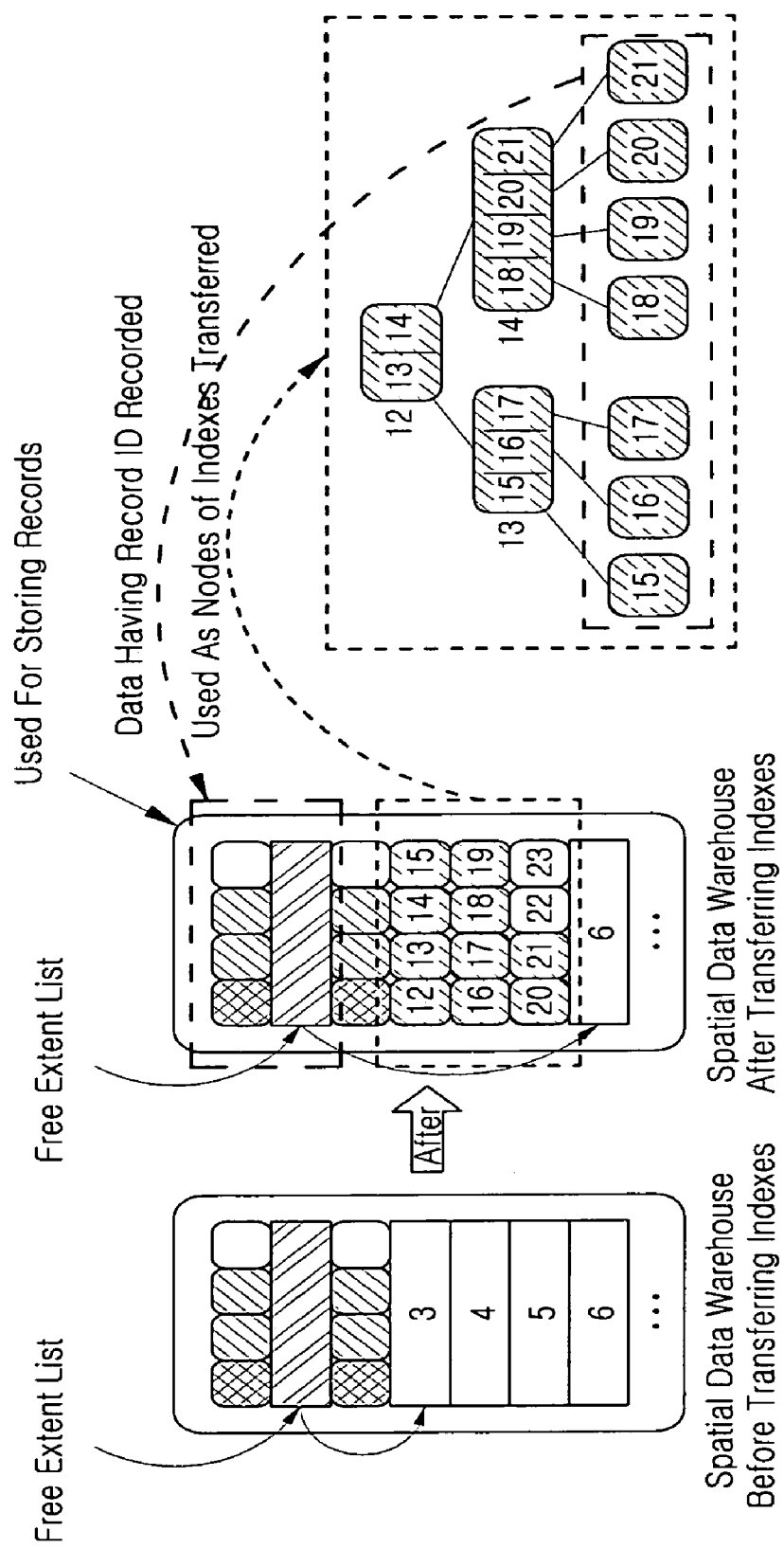
[Figure 6]

[Figure 7]
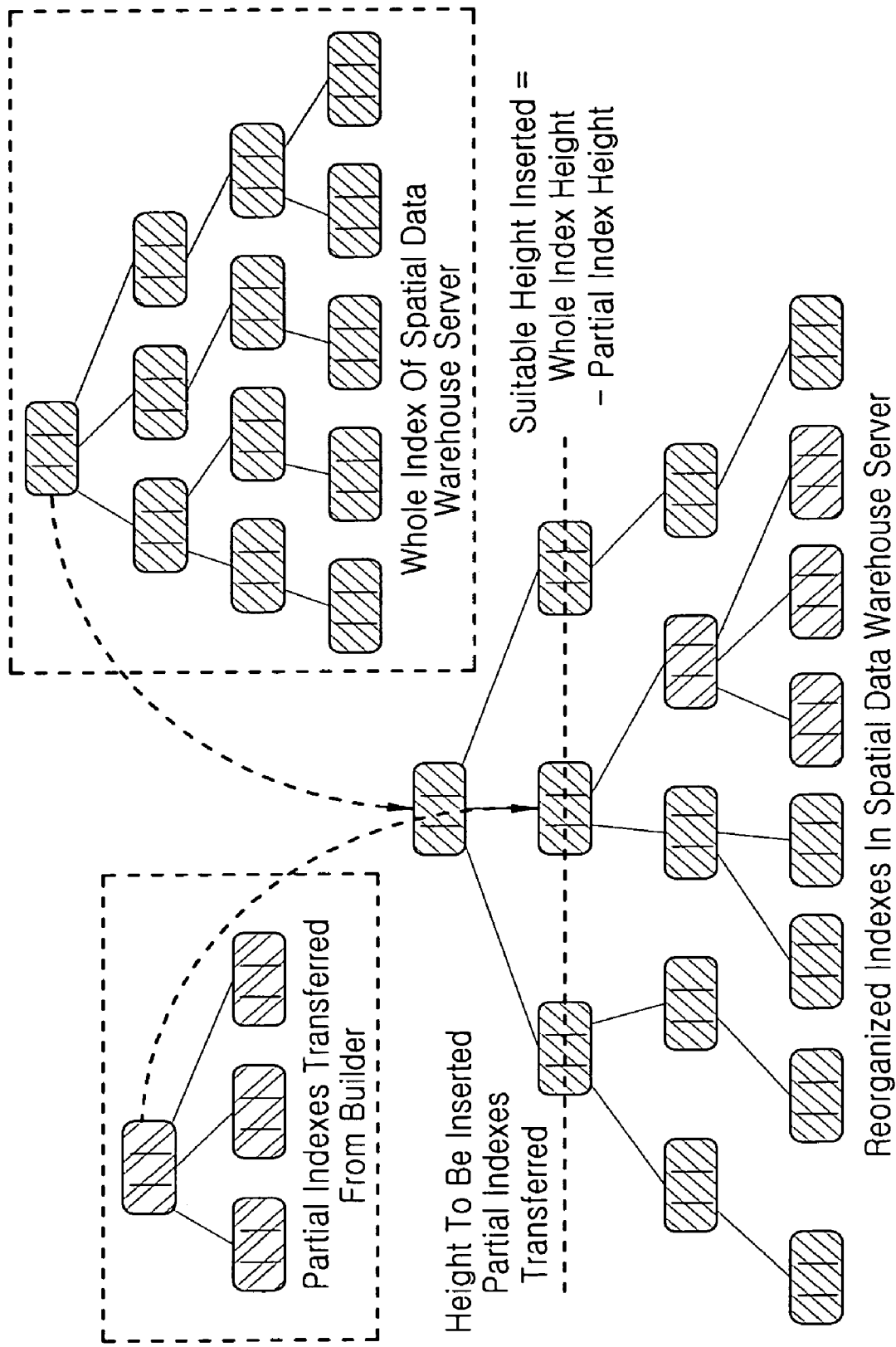

SYSTEM AND METHOD FOR INDEX REORGANIZATION USING PARTIAL INDEX TRANSFER IN SPATIAL DATA WAREHOUSE

BACKGROUND OF THE INVENTION

1. Field of the Invention

The present invention relates to a system and a method for index reorganization using a partial index transfer in a spatial data warehouse and, more particularly, to a system and a method for index reorganization using a partial index transfer in a spatial data warehouse that minimize costs of search, fragmentation and readjustment for the index reorganization by organizing and transferring clusters with partial indexes in conformity with an index structure so that the partial indexes may be inserted directly into the existing index, thus ensuring continuous and stable data processes and enhancing the capabilities of the system.

2. Description of Related Art

Data warehouse is a database that is extracted, converted, integrated and summarized via various operating systems to help users to make decisions. IBM introduced such concept initially in the mid-1980s for the purpose of marketing their hardwares using a term of information warehouse.

Data warehouse comprising a primitive data layer, a data warehouse layer and a client layer extracts, stores, inquires data. In such data warehouse, the operating system provides automated inventory control and accounting information management, required for organization management, and specialized functions such as a business system, and the data warehouse builds data with priority given to the themes such as clients, products, accounting, etc.

Spatial data warehouse for processing spatial data comprising a spatial data warehouse server and a builder storing all changes of source data to a repository thereof and loading the stored data into the spatial data warehouse server via a batch processing by regular periods.

Moreover, the data warehouse server interrupts the user service to load data transferred from the builder for the purpose of building indexes and builds indexes using the loaded data to provide prompt responses to user's queries.

Conventional methods for organizing indexes include a bulk insertion technique, a seeded clustering technique and an index transfer technique.

The bulk insertion technique of multidimensional indexes generates several clusters by clustering data spatially adjacent to one another. The respective clusters generated are composed of Small-Trees and the respective Small-Trees are inserted into the existing R-Tree.

Meanwhile, data, not included in any clusters, are classified as outliers and such data are inserted in ones via a well-known insertion algorithm. Such technique requires greater cost in clustering data and causes a greater overlap between the existing R-Tree nodes and newly inserted Small-Tree nodes. Accordingly, the bulk insertion technique has some drawbacks that deteriorate the performances of insertion and search (L. Chen, R. Choubey and E. A. Rundensteiner, "Bulk-insertions into R-tree using the small-tree-large-tree approach", ACM GIS, 1998).

The seeded clustering technique clusters data in conformity with the existing index structure, not with the conventional spatial proximity. Since the clustering technique according to the spatial proximity does not consider the existing index structure, it has a strong possibility of expanding index areas and its complicated process requires lots of clustering costs.

Meanwhile, since the seeded clustering technique clusters data by inserting data into a root section of index, it causes a lesser overlap between nodes than the conventional clustering technique, which results in a rapid clustering process; however, it also has a strong possibility of expanding index areas and its complicated process requires lots of clustering costs (Taewon Lee, Bongki Moon and Sukho Lee "Bulk Insertion for R-Tree by Seeded Clustering", DEXA, 2003).

The index transfer technique organizes indexes by directly transferring the index structure for reusing of the existing index. The problem of physical mapping of the existing index due to the index transfer is solved by reserving consecutive extents. According to this technique, it is possible to reduce the index organization cost by removing search, segmentation and minimum bounding rectangles (MBR) reorganization costs for the index organization via the index transfer, however, it is unsuitable for the index reorganization technique of the spatial data warehouse in which periodical source data changes occur (Sang-Keun Park, Ho-Seok Kim, Jae-Dong Lee and Hae-Young Bae, "An efficient index transfer method for reducing index organization cost in distributed database systems", Korean Information Science Society, 2003).

SUMMARY OF THE INVENTION

Accordingly, an object of the present invention is to provide a system and method for index reorganization using a partial index transfer in a spatial data warehouse that minimize costs of search, fragmentation and readjustment for index reorganization by clustering extracted data in conformity with an index structure and transferring partial indexes to the respective clusters generated so that the partial indexes can be directly inserted into the existing index, thus ensuring continuous and stable data processes and enhancing the capabilities of the system.

To accomplish the object of the present invention, there is provided an index reorganization system using a partial index transfer in a spatial data warehouse, in a spatial data warehouse system, the system comprising: a builder for clustering data extracted and loaded from a source database in conformity with an index structure and for generating partial indexes from generated clusters to transfer the generated partial index to a spatial data warehouse server; and a spatial data warehouse server for reserving physically consecutive spaces, not allocated, in a data repository thereof, so as to record partial indexes transferred from the builder in the reserved spaces and for inserting the recorded partial indexes in an existing index thereof.

The builder transfers the partial indexes on a page basis, receives a root section of the existing index from the spatial data warehouse server and clusters via the root section of the indexes received.

Moreover, the builder transfers a spatial reservation message for the partial indexes to the spatial data warehouse server, when a load point of time that a user designated comes, and transfers the partial indexes when a reservation completion message is received from the spatial data warehouse server.

Furthermore, the builder transfers the partial indexes in sequential order of a root node, a parent node and a leaf node and transfers records corresponding to the leaf nodes at the same time when transferring the partial indexes.

To accomplish another object of the present invention, there is provided an index reorganization method using a partial index transfer in a spatial data warehouse, in an index reorganization method in a spatial data warehouse system comprising a source database, a builder and a spatial data warehouse server, comprising: a first step of clustering data extracted from a source database in conformity with an index structure via a builder; a second step of generating partial indexes and transferring the partial indexes to clusters generated in the first step; a third step of recording the transferred partial indexes in physically consecutive spaces, not allocated, in a spatial data warehouse server; and a fourth step of inserting the recorded partial indexes in an existing index.

The clustering in the first step is executed by receiving a root section of the existing index from the spatial data warehouse server and through the root section of the indexes received.

Moreover, the transferring in the second step is executed by transferring a spatial reservation message to the spatial data warehouse server, when a load point of time that a user designated comes, and by transferring the partial indexes when a reservation completion message is received from the spatial data warehouse server.

Furthermore, the transfer of the partial indexes is executed on a page basis and in sequential order of a root node, a parent node and a leaf node.

In addition, when transferring the partial indexes, records corresponding to the leaf nodes are transferred at the same time.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic diagram showing a system embodying the present invention;

FIG. 2 is a flowchart illustrating an overall operation of the invention;

FIG. 3 is a schematic diagram depicting a data repository of a spatial data warehouse server in FIG. 1;

FIG. 4 is a diagram explaining a process of generating partial indexes in a builder in FIG. 1;

FIG. 5 is a diagram illustrating a process of transferring the partial indexes from the builder to the spatial data warehouse server in FIG. 1;

FIG. 6 is a schematic diagram of the partial indexes transferred to and written in the spatial data warehouse server in FIG. 1; and FIG. 7 is a diagram describing a process of inserting the partial indexes in the spatial data warehouse server in FIG. 1.

DETAILED DESCRIPTION OF THE INVENTION

Hereinafter, a detail description of the present invention will be given with reference to the attached drawings. The present invention is not restricted to the following embodiments, and many variations are possible within the spirit and scope of the present invention. The embodiments of the present invention are provided in order to more completely explain the present invention to anyone skilled in the art.

FIG. 1 is a schematic diagram showing a system embodying the present invention, wherein the system roughly comprises a source database 100, a builder 200 and a spatial data warehouse server 300.

The builder 200 comprises a temporary data repository 210; an extraction, transformation and loading (ETL) processor 220; a partial index transfer manager 230; and a loader 240. That is, the ETL process 220 extracts data changed in the source database to transform and cleanse the extracted data, thus loading the resultant data into the temporary data repository 210. The partial index transfer manager 230 generates a partial index for the data loaded in the temporary data repository 210 and transfers the partial index to the spatial data warehouse server 300.

The ETL processor 220 of the builder 200 includes an extract manager 221 for extracting data from the source database 100; a conversion manager 222 for converting and cleansing the extracted data; and a load manager 223. The partial index transfer manager 230 includes a cluster manager 231 for clustering the extracted data from the source database 100 in conformity with the index structure; a partial index generator 232 for generating a partial index based on the cluster generated; and an index transfer processor 233.

The spatial data warehouse server 300 comprises a load mediator 310; an index processor 320; a data repository 330; a query processor 340; and a materialized view manager 350. That is, the index processor 320 for inserting a partial index transferred from the loader 240 via the load mediator 310 into the existing index includes a partial index recorder 321 and a whole index inserter 322. The data repository 330 includes an index repository 331 storing indexes and a record repository 332 storing records. The query processor 340 includes a structured query language (SQL) processor 341, a spatial on-line analytical processor (OLAP) 342 and a query optimizer 343. The spatial OLAP 342 supports a spatial on-line analytical processing (OLAP) operation using a reorganization index.

Hereinafter, the present invention as constructed as above will now be described in detail with reference to FIG. 2.

First, if the extract manager 221 of the builder 200 extracts data changed in the source database 100 and the conversion manager 222 transforms and cleanses the extracted data, the load manager 223 loads the resultant data into the temporary data repository 210.

The cluster manager 231 of the partial index transfer manager 230 clusters data loaded from the ETL processor 220 into the temporary data repository 210 in conformity with the index structure, not with the spatial proximity, and the partial index generator 232 generates partial indexes to the respective clusters generated from the cluster manager 231 [ST 100].

The index transfer processor 233 of the partial index transfer manager 230 transfers the partial indexes generated from the partial index generator 232 to the spatial data warehouse server 300 on a page basis via the loader 240 [ST 200].

The partial indexes transferred from the builder 200 are input to the index processor 320 via the load mediator 310 so as to be recorded in the index repository 331 of the data repository 330 by means of the partial index recorder 321 of the index processor 320.

Here, to solve the problem of physical mapping of the partial indexes transferred from the builder 200, the spatial data warehouse server 300 reserves physically neighbored spaces in the index repository 331 of the data repository 330 so as to record the partial indexes in the reserved spaces via the partial index recorder 321 [ST 300].

Moreover, the recorded partial indexes are inserted into the existing index in the spatial data warehouse server 300 using a well-known insertion algorithm via the whole index inserter 322 [ST 400].

In case of spatial data, the insertion algorithm of R-Tree selects first a leaf node L on which an entry E is to be positioned. Here, the leaf node L that minimally expands the existing boundary rectangle is selected and, if the expanded areas are identical to one another, the leaf node L of the smallest area is selected. If the selected leaf node L has a room, the entry E is positioned, otherwise, the leaf node L is split. Here, the rectangular areas of the split two nodes are to be minimized. If the leaf node L is split, the tree is to be reorganized, in which the rectangle included in a parent node is to be adjusted and the split effect is delivered in the root direction.

FIG. 3 is a schematic diagram depicting the data repository 330 of the spatial data warehouse server 300, of which structure is the same as the temporary data repository 210 of the builder 200.

The node of index uses a page, a standard unit of file input/output, and four pages constitute an extent, a standard unit of spatial allocation.

Free Extent List of FIG. 3 shows a list of not-allocated extent, a table of database (data repository 330 of FIG. 1), and a list of returned extents among the extents used in index structures.

With reference to FIG. 4, a diagram explaining the process of generating the partial indexes in the builder 200, the builder 200 receives a root section of the existing index in the spatial data warehouse server 300 in order to generate partial indexes from the data being loaded.

The level of the root section is determined according to the height of the index and the number of data to be inserted. Data stored in the temporary data repository 210 is clustered via the root section of the existing index. The respective clusters in the cluster pool generate partial indexes via a well-known index insertion method.

In FIG. 5, a diagram illustrating the process of transferring the partial indexes from the builder 200 to the spatial data warehouse server 300, the partial indexes generated from the builder 200 are stored to the temporary data repository 210 of the builder 200. When the load point of time that the user designated comes, the builder 200 transfers a spatial reservation message for the partial indexes to the spatial data warehouse server 300. The spatial data warehouse server 300 reserves consecutive extent spaces for storing the partial indexes and, then, transfers a reservation completion message to the builder 200.

When the builder 200 receives the reservation completion message, it transfers the partial indexes in sequential order of a root node, a parent node and a leaf node. Since tuple-ID values to be recorded in the leaf nodes cannot be used in the spatial data warehouse due to physical properties, the leaf nodes are transferred along with the corresponding records.

FIG. 6 is a schematic diagram of the partial indexes transferred to and written in the spatial data warehouse server 300. It shows the structures of the data repository 330 of the spatial data warehouse server 300 before and after transfer of the indexes, assuming that the partial indexes composed of ten nodes are transferred from the builder 200.

If the spatial data warehouse server 300 receives from the builder 200 a message that the partial indexes are transferred, it reserves not-allocated sequential extents.

The organization of the partial indexes, i.e., the method of recording the received partial indexes in the partial index recorder 321 of the spatial data warehouse server 300 is executed in sequential order of a root node, a parent node and a leaf node in the same manner as the index structure transfer.

In FIG. 6, node No. 12 has two items and, the page offset values, child node IDs that the respective items will have, can be expected as node No. 13 and node No. 14. Using this, the spatial data warehouse server 300 can reorganize the partial indexes transferred from the builder 200 and remove the parent node accessing cost for recording child nodes by recording the child node IDs to be recorded when storing the partial indexes prior to allocation of child nodes.

Describing the above in detail, the spatial data warehouse server 300 records the parent node data as well as the location information of the child nodes by identifying the location information of the child nodes using the reserved storing spaces, thus eliminating further cost of accessing the parent node for recording the location information of the child nodes.

The recording of the child node IDs is executed in a direction from the root node to the leaf node and, in case of identical levels, it is recorded from left to right. Since the child node IDs that the entry of transferred nodes will have are recorded in sequential order from the smallest value to the largest value among the reserved page offset values, it is possible to expect the page offset values, the IDs for the child nodes, in the process of recording entries in the respective nodes.

That is, FIG. 6 is directed to the root node having two entries, wherein the smallest value 12 among the page offset values reserved for recording is used and the very next values 13 and 14 are to be given in turn as the child node offset values that the entries in the root node will have. Accordingly, the recording process can be made before actual child nodes No. 13 and No. 14 are allocated, which results in removing of further cost of accessing the parent node for recording the location information of the child nodes.

Now referring to FIG. 7, a diagram describing a process of inserting the partial indexes in the spatial data warehouse server 300, the spatial data warehouse server 300 inserts the partial indexes transferred from the builder 200 into the existing whole index. The method of searching for nodes is identical with the well-known method of searching for indexes.

However, since the heights of all leaf nodes should be identical to one another because of the properties of the indexes, the height available for the partial indexes is calculated. Among the nodes located in the calculated height, appropriate nodes, into which the partial indexes are inserted, are selected via the well-known searching method. If the selected node has an empty entry, the partial indexes are inserted into the empty entry, whereas, if the selected node does not have an empty entry, the partial indexes are inserted via heuristic methods.

A blind search method such as a depth-first search (DFS) or a breath-first search (BFS) is very exhaustive one that searches for paths up to the goals. That is, although the blind search method can provide a solution for a problem, it expands too much nodes, which is unpractical. In many problems, to reduce the search operation, some general rules of thumb may be applied, even though they do not provide right solutions at all times. As such, the method of rapidly proceeding with the search operation using special information on the problems expressed with graphs is referred to as a heuristic searching method, and the information used thereby is referred to as heuristic information.

By using the heuristic method that determines or reschedules the sequence of successor nodes generated newly based on the heuristic information, the search can proceed to expand the most desirable nodes. As such, the sequence rescheduling requires a measure for evaluating the desirable degree of nodes and the measure is referred to as an evaluation function.

The aim of the evaluation function is to determine which nodes will very likely be in an optimum path to a target node by grading the nodes to be expanded. The evaluation function is based on various conceptions including such instances that a probability that a certain node may be in an optimum path is used; that a distance or a difference between a voluntary node and target nodes is used; or that is based on characteristics related to the possibilities up to the goal in computer game or puzzle.

As described in detail above, the present invention has been disclosed herein with reference to preferred embodiments, however, it will be understood by those of ordinary skill in the art that various changes in form and details may be made without departing from the spirit and scope of the present invention as set forth in the following claims.

What is claimed is:

1. In an index reorganization method in a spatial data warehouse system comprising a source database, a builder and a spatial data warehouse server, an index reorganization method using a partial index transfer in a spatial data warehouse comprising:

a first step of clustering data extracted from a source database in conformity with a constructed index structure in said spatial data warehouse via a builder;

a second step of generating partial indexes and transferring the partial indexes to clusters generated in the first step, the transfer of the partial indexes is executed in sequential order of a root node, a parent node and a leaf node;

a third step of recording the transferred partial indexes in physically consecutive spaces, not allocated, in a spatial data warehouse server; and a fourth step of inserting the recorded partial indexes in an existing index;

a fifth step of determining a sequence of successor nodes using a heuristic searching method;

a sixth step of rescheduling the sequence of successor nodes using a heuristic searching method;

evaluating a desirable degree of successor nodes within the sequence of successor nodes; and outputting a graph of a desirable degree of successor nodes within a sequence.

2. The index reorganization method using a partial index transfer in a spatial data warehouse as recited in claim 1, wherein the clustering in the first step is executed by receiving a root section of the existing index from the spatial data warehouse server and through the root section of the indexes received.

3. The index reorganization method using a partial index transfer in a spatial data warehouse as recited in claim 1, wherein the transferring in the second step is executed by transferring a spatial reservation message to the spatial data warehouse server, when a load point of time that a user designated comes, and by transferring the partial indexes when a reservation completion message is received from the spatial data warehouse server.

4. The index reorganization method using a partial index transfer in a spatial data warehouse as recited in claim 3, wherein the transfer of the partial indexes is executed on a page basis.

5. The index reorganization method using a partial index transfer in a spatial data warehouse as recited in claim 4, wherein the transfer of the partial indexes is executed in sequential order of a root node, a parent node and a leaf node.

6. The index reorganization method using a partial index transfer in a spatial data warehouse as recited in claim 5, wherein when transferring the partial indexes, records corresponding to the leaf nodes are transferred at the same time.

7. The index reorganization method using a partial index transfer in a spatial data warehouse as recited in claim 1, wherein the physically consecutive spaces, not allocated, are consecutively reserved extents.

8. The index reorganization method using a partial index transfer in a spatial data warehouse as recited in claim 7, wherein page offset values, which are IDs of nodes, can be expected by the consecutively reserved extents.

* * * * *